United States Patent [19]

Inoue

[11] Patent Number: 4,536,632
[45] Date of Patent: Aug. 20, 1985

[54] WIRE-CUT ELECTROEROSION METHOD AND APPARATUS UTILIZING WIRE-CLEANING MEANS

[75] Inventor: Kiyoshi Inoue, Tokyo, Japan

[73] Assignee: Inoue-Japax Research Incorporated, Yokohama, Japan

[21] Appl. No.: 500,860

[22] Filed: Jun. 3, 1983

[30] Foreign Application Priority Data

Jun. 3, 1982 [JP] Japan .................. 57-95717

[51] Int. Cl.³ .............................................. B23P 1/08
[52] U.S. Cl. ................... 219/69 W; 219/69 E; 219/69 M
[58] Field of Search ............. 219/69 M, 69 W, 69 E, 219/69 D, 69 V; 204/129.7, 206, 208

[56] References Cited

U.S. PATENT DOCUMENTS

| 2,785,280 | 3/1957 | Eisler et al. | 219/69 W |
| 3,936,653 | 2/1976 | Bals | 219/69 W |
| 4,205,213 | 5/1980 | Inoue | 219/69 W |

FOREIGN PATENT DOCUMENTS

| 2075400 | 11/1981 | United Kingdom | 219/69 W |
| 2078152 | 1/1982 | United Kingdom | 219/69 W |

Primary Examiner—M. H. Paschall
Attorney, Agent, or Firm—Karl F. Ross; Herbert Dubno

[57] ABSTRACT

Wire-cut electroerosion method and apparatus whereby breakage of an electrode wire is substantially prevented by limiting air-bubbling in the cutting zone from the electrode wire traveling through a liquid-machining medium. The air-bubbling is limited by cleaning the electrode wire advancing from its storage reel prior to its entry into the cutting zone supplied with the liquid machining medium. The electrode wire may be cleaned by brushing the wire between the storage reel and the wire-braking roller and thereafter cleansed by a showering fluid. Preferably, ultrasonic vibrations are applied to the showering fluid. The braking rollers and a wire-conducting roller are also provided with brushes to prevent contaminants from being introduced onto the cleaned electrode wire by these rollers.

10 Claims, 1 Drawing Figure

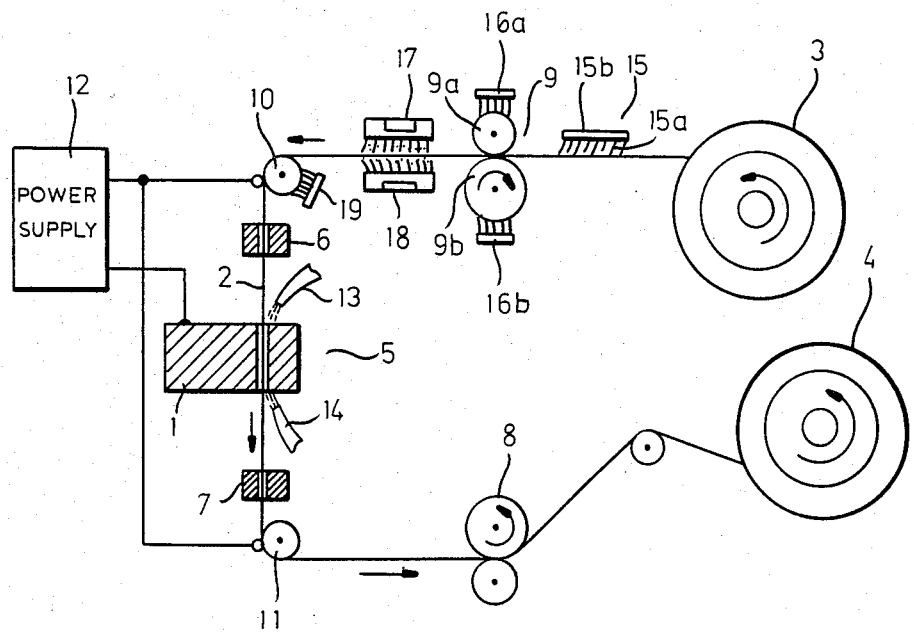

WIRE-CUT ELECTROEROSION METHOD AND APPARATUS UTILIZING WIRE-CLEANING MEANS

FIELD OF THE INVENTION

The present invention relates generally to a wire-cut electroerosion method and apparatus and, more particularly, to a new and improved method of and apparatus for electroerosively cutting a workpiece by means of a continuously renewable electrode wire.

BACKGROUND OF THE INVENTION

In the wire-cut electroerosion process which is also called wire-cut or traveling-wire EDM (electrical discharge machining), a continuous electrode wire (the term is commonly used to refer to an electrically conductive wire, filament, tape, ribbon or like continuous elongate electrode element) is stored on a supply reel disposed in air and is arranged to extend continuously from this reel to takeup means over a cutting zone defined between a pair of wire guide members and supplied with a liquid machining medium such as distilled water. A workpiece is disposed in the cutting zone into and through which the electrode wire penetrates and travels in spaced juxtaposition with the workpiece. A drive means is provided downstream of one of the guide members which is disposed on the wire takeup side to unwind the electrode wire from the storage reel and to advance it along the path of wire travel so that the wire travels through and in juxtaposition with the workpiece between the guides members. An EDM power supply is connected electrically with the electrode wire and the workpiece to effect a succession of electrical discharges between the traveling wire and the workpiece, thereby electroerosively removing material from the workpiece. Wire braking means is provided on the wire supply side in the path of wire travel to apply to the advancing electrode wire a tension which must be sufficient to ensure the linearity of the electrode wire traveling through the workpiece between the wire guide members.

One of the problems which have hitherto been encountered in the wire-cut electroerosion process is breakage of the electrode wire. The traveling electrode wire tends to break when excessive heat and/or mechanical stress develops in the cutting zone.

I have discovered that these causes of breakage of the electrode wire are attributable at least partly to air bubbling in the cutting zone from the electrode wire which, after travel through the air space on the upstream side of the cutting zone, passes into and through the liquid machining medium in the latter where electrical discharges are effected generating heat to produce an elevated temperature. I have now found that the air is entrained with the traveling electrode into the liquid machining medium where it causes bubbles and the generated air bubbles tend to concentrate at a localized site in the cutting zone to create a thermal arc discharge when the electrode wire supplied from the storage reel has residual contaminants on the surface thereof. These air bubbles give rise to an extremely high mechanical stress and the resulting arc discharge constitutes a thermal source sufficient to cause the breakage of the electrode wire.

OBJECTS OF THE INVENTION

The present invention, based upon the foregoing inventor's discovery, seeks to provide a novel and improved wire-cut electroerosion method whereby the electrode is effectively rendered less liable to break in the cutting zone so as to improve the efficiency of the wire-cut electroerosion process.

The present invention also seeks to provide a wire-cut electroerosion apparatus which is relatively simple but highly efficient to prevent the traveling electrode wire from being broken in the cutting zone, thereby increasing the efficiency of a given cutting operation.

SUMMARY OF THE INVENTION

In accordance with the present invention there is provided, in a first aspect thereof, a method of electroerosively cutting a workpiece by means of a continuously renewed electrode wire which is advanced from a wire storage means in air to travel through and in spaced juxtaposition with the workpiece in a cutting zone defined between a pair of wire guide members in a path of wire travel and supplied with a liquid machining medium while electrical discharges are effected between the traveling electrode wire and the workpiece through the liquid machining medium to electroerosively remove material removal from the workpiece, which method includes limiting air-bubbling in the cutting zone from the electrode wire traveling through the liquid machining medium by cleaning the advancing electrode wire prior to its entry into the liquid machining medium in the cutting zone.

According to specific features of the invention, the cleaning is preferably advantageously carried out by brushing the advancing electrode wire in the path of wire travel between the wire storage means and the cutting zone. The brushed advancing electrode wire prior to its entry into the machining liquid medium is preferably showered with an uncontaminated fluid to facilitate the cleaning of the brushed advancing electrode wire, ultrasonic vibrations may be imparted to the showering fluid.

The invention also provides in a second aspect thereof a wire-cut electroerosion apparatus having a wire storage reel disposed in air for supplying a continuous electrode wire, means for advancing the electrode wire from the wire storage reel to cause it to travel through and in a spaced juxtaposition with a workpiece in a cutting zone defined between a pair of wire guide members in a path of wire travel and supplied with a liquid machining medium, and means for effecting electrical discharges between the traveling electrode wire and the workpiece through the supplied liquid machining medium to electroerosively cut the workpiece, which apparatus includes means for cleaning the advancing electrode wire prior to its entry into the cutting zone.

Specifically, the cleaning means preferably and advantageously includes brush means disposed for brushing relationship with the advancing electrode wire between the wire storage reel and the cutting zone. Additionally, means should preferably be included disposed downstream of the brush means and upstream of the cutting zone in the path of wire travel for showering the brushed advancing electrode wire with an uncontaminated fluid prior to its entry into the said liquid machining medium in the cutting zone. The showering means is preferably associated with ultrasonic means for applying ultrasonic vibrations to the showering fluid prior to its joining the liquid machining medium.

BRIEF DESCRIPTION OF THE DRAWING

These and other features of the present invention as well as advantages thereof will become more readily apparent from a reading of the following description when taken with reference to the accompanying drawing in which the sole FIGURE is a schematic view partly in section, diagrammatically illustrating a wire-cut electroerosion apparatus which embodies the present invention.

SPECIFIC DESCRIPTION

Referring now to the drawing, a typical wire-cut electroerosion apparatus for cutting a workpiece 1 by means of an electrode wire 2 includes a wire storage reel 3. The electrode wire 2 is shown to extend continuously from the storage reel 3 to a takeup reel 4 over a cutting zone 5 defined between a pair of wire guide members 6 and 7 and where the workpiece 1 is disposed. The electrode wire 2 is unwound and advanced from the storage reel 3 by means of a wire drive 8 to travel through and in a spaced juxtaposition with the workpiece 1 in the cutting zone 5, the wire drive 8 being constituted by a capstan and a pinch roller and disposed between the cutting zone 5 and the takeup reel 4. In the path of wire travel upstream of the cutting zone 5, there is provided a wire-braking unit 9 constituted again by a capstan and a pinch roller, 9a and 9b, for applying to the wire 2 a tension sufficient to ensure its linearity between the guide members 6 and 7 through the cutting zone 5.

Between the braking unit 9 and the upstream guide member 6 and between the downstream guide member 7 and the wire-drive unit 8 there are provided, respectively, wire-conducting roller units 10 and 11 which are connected electrically to one terminal of an electroerosion power supply 12. The other terminal of the power supply 12 is electrically connected to the workpiece 1. Two nozzles 13 and 14 are disposed on the two sides of the workpiece 1 to supply a liquid machining medium into a machining gap formed between the traveling electrode wire 2 and the workpiece 1 in the cutting zone 5. Instead of using such nozzles, the workpiece 1 may bodily be immersed in a mass of the liquid medium in a worktank to supply the liquid machining medium into the machining gap in the cutting zone 5. The power supply 12 is adapted to supply a succession of electrical pulses between the traveling electrode wire 2 and the workpiece to effect time-spaced electrical discharges through the liquid machining medium across the machining gap to electroerosively remove material from the workpiece 1. As material removal continues, the workpiece is displaced transversely to the electrode wire traveling in the cutting zone 5 along a programmed path to form a desired cut in the workpiece 1.

In embodying the present invention, the apparatus shown further includes a brush 15 composed of bristles 15a set in a support member 15b and disposed in a brushing engagement with the electrode wire 2 advancing from the storage reel 3 to the wire-braking unit 9. Furthermore, the capstan and pinch rollers, 9a and 9b, are each provided with respective brushes 16a and 16b held in a brushing relationship therewith. Between the braking unit 9 and the upstream wire-conducting roller unit 10 there is provided a showering unit 17 for showering the brushed advancing electrode wire 2 with a clean fluid such as uncontaminated water. The showering unit 17 may be in the form of a hollow cylinder having a manifold connected to an external source of the clean fluid and a multiplicity of apertures for spreading the fluid from the manifold therethrough onto the electrode wire advancing through the inner space of the cylinder. Preferably, bristles are set on the inner wall of the cylinder to further brush the advancing electrode wire while it is being showered. Preferably, the showering unit 17 is provided with one or more ultrasonic transducers 18, here in the form of a ring attached to or embedded in the cylinder, to impart ultrasonic mechanical vibrations to the showering fluid so as to facilitate the cleaning of the advancing electrode wire 2. In addition, the upstream wire-conducting roller 10 is shown provided with a brush 19 in a brushing relationship therewith. The brushes 16a, 16b and 19 are used to eliminate the introduction of contaminants by the rollers 9a, 9b and 10 onto the brushed and cleaned advancing electrode wire 2.

By virtue of the provision of cleaning and/or cleaning means as described, it has been found that there is produced a marked wettability of the traveling electrode wire 2 with the liquid machining medium in the cutting zone 5. As a result, very little air is entrained on the surface of the electrode wire 2 joining the liquid machining medium so that a greater amount of the latter is introduced into the machining gap. Furthermore, the minimized amount of air bubbles is well dispersed throughout the machining gap and ejected promptly therefrom so that there is practically no localized heating of the electrode wire in the cutting zone, but rather an increased cooling of the traveling electrode heated by the electrical discharge heat in the cutting zone. In this manner, the breakage of the electrode wire is effectively prevented and electroerosive material removal is allowed to proceed at an enhanced rate.

What is claimed is:

1. A method of electroerosively cutting an electrically conductive workpiece by means of a traveling electrode, comprising the steps of:
   (a) dispensing an unused, thin, continuous electrically conductive wire from a wire storage reel in an air space to advance the dispensed unused wire while in contact with air along a wire feed path;
   (b) guiding the advancing wire by means of a pair of spaced-apart wire guide members across the workpiece to constitute said traveling electrode moving while in contact with a liquid machining medium along a single, straight-line cutting path established by said members penetrating the workpiece in a cutting zone downstream of said wire feed path, the wire electrode being taken up downstream of said cutting path for disposal;
   (c) applying to said wire traveling between said guide members a sufficient tension to maintain it tensely stretched therebetween, and moving substantially in alignment with said single, straight-line cutting path and spacedly juxtaposed with the workpiece in the cutting zone;
   (d) effecting a succession of erosive electrical discharges between said tensely stretched traveling electrode wire and the workpiece through the liquid machining medium while translationally displacing said straight-line cutting path in the workpiece along a programmed contouring path to electroerosively form a cut therein with a contour corresponding to said programmed path; and (e) removing entrained air and contaminants from said thin, tensely stretched traveling electrode wire by cleaning said unused wire advancing along said wire feed path between a pair of rollers enaging opposite sides of said wire prior to its entry into said straight-line path and brushing each of said rollers continuously with respective brushes to an extent sufficient to reduce to a minimum air-bubbling from said electrode wire moving in contact with said liquid machining medium in said cutting zone and so that said cleaning occurs before said wire ever enters said zone, thereby preventing said wire from breaking in said cutting zone.

2. The method defined in claim 1 wherein step (e) includes subjecting said advancing unused wire to a brushing action prior to its entry into said straight-line path.

3. The method defined in claim 2 wherein step (e) further includes showering the advancing unused wire subjected to said brushing action with an uncontaminated fluid in said wire feed path upstream of said straight-line path.

4. The method defined in claim 3 wherein step (e) further includes applying ultrasonic vibrations to said showering fluid in said wire feed path upstream of said straight-line path.

5. An apparatus for electroerosively cutting an electrically conductive workpiece by means of a traveling electrode, the apparatus comprising:
- a wire storage reel disposed in an air space for dispensing an unused, thin, continuous electrically conductive wire;
- means for advancing the dispensed unused wire while in contact with air along a wire feed path;
- a pair of spaced-apart guide members disposed downstream of said wire feed path for providing a single, straight-line cutting path along which the wire advancing from said feed path to move, constituting said traveling electrode, in contact with a liquid machining medium in a cutting zone penetrating said workpiece;
- means for taking up the electrode wire downstream of said cutting path;
- means for applying to said wire traveling between said guide members a sufficient tension to maintain it tensely stretched therebetween and moving substantially in alignment with said single, straight-line cutting path and spacedly juxtaposed with a portion of the workpiece in the cutting zone;
- means for translationally displacing said straight-line cutting path in the workpiece along a programmed contouring path while a succession of erosive electrical discharges are effected between said tensely stretched traveling electrode wire and the workpiece through the liquid machining medium to electroerosively form a cut therein with a contour corresponding to said programmed path; and
- a pair of rollers engaging said thin, tensely stretched traveling electrode on opposite sides thereof and respective brushes in continuous contact with said rollers for cleaning said unused wire advancing along said wire feed path prior to its entry into said straightline path to remove entrained air and contaminants to an extent sufficient to reduce to a minimum air-bubbling from said electrode wire moving in contact with said liquid machining medium in said cutting zone and so that said cleaning occurs before said wire ever enters said zone, thereby preventing breaking of said wire.

6. The apparatus defined in claim 5, further comprising brush means disposed for brushing relationship with said advancing unused wire prior to its entry into said straight-line path.

7. The apparatus defined in claim 6, further comprising means disposed downstream of said brush means in said wire feed path for showering fluid on said brushed unused wire prior to entry into said straight-line path.

8. The apparatus defined in claim 7, further comprising means associated with said showering means for imparting ultrasonic vibrations to said showering fluid in said wire feed path upstream of said straight-line path.

9. The apparatus defined in claim 7 wherein said tension-applying means includes braking roller means disposed in said wire feed path upstream of said straight-line cutting path, further comprising a brush arranged out of contact with said wire but in contact with said roller means for brushing a surface thereof in rotary engagement with said wire.

10. The apparatus defined in claim 7, further comprising wire-conducting roller means for electrically energizing said electrode wire to effect said erosive electrical discharges, said wire-conducting roller means having a brush arranged out of contact with said wire but in contact with a surface of said roller means in rotary engagement with said wire.

* * * * *